United States Patent
Kim et al.

(10) Patent No.: US 8,229,233 B2
(45) Date of Patent: Jul. 24, 2012

(54) METHOD AND APPARATUS FOR ESTIMATING AND COMPENSATING SPATIOTEMPORAL MOTION OF IMAGE

(75) Inventors: Il-koo Kim, Osan-si (KR); Woo-jin Han, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1121 days.

(21) Appl. No.: 12/105,718

(22) Filed: Apr. 18, 2008

(65) Prior Publication Data

US 2009/0060359 A1   Mar. 5, 2009

(30) Foreign Application Priority Data

Aug. 28, 2007  (KR) .................. 10-2007-0086549

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl. ...................... 382/236; 382/233

(58) Field of Classification Search .......... 382/107, 382/233, 236, 238; 348/407.1, 413.1, 416.1; 375/240.12, 240.16
See application file for complete search history.

(56) References Cited

U.S. PATENT DOCUMENTS

| 6,026,195 A | 2/2000 | Eifrig et al. |
| 6,498,810 B1* | 12/2002 | Kim et al. ............. 375/240 |
| 2003/0112864 A1* | 6/2003 | Karczewicz et al. .... 375/240.01 |
| 2004/0001546 A1 | 1/2004 | Tourapis et al. |
| 2005/0013362 A1 | 1/2005 | Pearson et al. |
| 2006/0034374 A1* | 2/2006 | Park et al. ............. 375/240.16 |
| 2006/0034529 A1 | 2/2006 | Park et al. |
| 2006/0072669 A1 | 4/2006 | Lin et al. |
| 2006/0268982 A1* | 11/2006 | Lee et al. ............. 375/240.03 |

FOREIGN PATENT DOCUMENTS

| EP | 0986262 A2 | 3/2000 |
| EP | 1585326 A1 | 10/2005 |
| EP | 1691559 A1 | 8/2006 |
| KR | 1020050115559 A | 12/2005 |

OTHER PUBLICATIONS

Panusopone, K. et al. ("An Efficient Implementation of Unrestricted Motion Compensation in Video Encoder," IEEE International Conference on acoustics, speech and signal processing, Apr. 15-20, 2007, pp. I-1005 to I-1008).*

Edirisinghe, E.A., et al. ("Shape adaptive padding for MPEG-4," IEEE Trans. Consumer Electronics, vol. 46, No. 3, Aug. 2000, pp. 514-520).*

"N2202—Information Technology—Coding of audio-visual objects: Visual ISO/IEC 14496-2 Committee Draft", May 28, 1998, 331 pages, XP002079325.

Communication dated Mar. 26, 2012 issued by the European Patent Office in corresponding European Application No. 08741515.4.

* cited by examiner

*Primary Examiner* — Yubin Hung
(74) *Attorney, Agent, or Firm* — Sughrue Mion, PLLC

(57) ABSTRACT

A method of estimating and compensating for motion in image decoding are provided. The method involves determining a reference block of a reference frame indicated by a motion vector of a current block of a current frame being decoded, and generating a spatiotemporal estimation block of the current block by using the current frame and the reference frame, when some pixels of the reference block are outside the reference frame.

20 Claims, 5 Drawing Sheets

METHOD AND APPARATUS FOR ESTIMATING AND COMPENSATING SPATIOTEMPORAL MOTION OF IMAGE

CROSS-REFERENCE TO RELATED PATENT APPLICATION

This application claims priority from Korean Patent Application No. 10-2007-0086549, filed on Aug. 28, 2007, in the Korean Intellectual Property Office, the disclosure of which is incorporated herein in its entirety by reference.

BACKGROUND OF THE INVENTION

1. Field of the Invention

The present invention relates to a method of estimating and compensating for motion in image encoding and decoding, and more particularly, to a method of estimating and compensating for motion when a current block refers to a region that is outside a reference frame by using a motion vector in image encoding and decoding.

2. Description of the Related Art

Video codecs such as H.263, Moving Picture Experts Group 2 (MPEG 2), MPEG 4, H.264/Advanced Video Coding (AVC), etc. use correlation between frames, perform a method of estimating and compensating for motion, and thereby increase compression efficiency, even when motion of an object appears in an image.

The method of estimating and compensating for motion refers to a reference block of a reference frame to reconstruct a block of a current frame. However, a part of the reference block determined by a motion vector may be outside the reference frame. The conventional video codecs such as H.263, MPEG 2, MPEG 4, H.264/AVC, etc. extend an outside region of the reference frame by using boundary pixels of the reference frame, and thereby estimate the part of the reference block which is outside the reference frame.

FIG. 1 is a diagram of a conventional method of estimating and compensating for motion when a reference block is outside a reference frame.

A current block 120 of a current frame 110 refers to a reference block 160 of a reference frame 150 by a motion vector. A region 170 included in the reference frame 150 is inserted into an equivalent region 130 of the current block 120. However, when a part 180 of the reference block 160 is outside the reference frame 150, an equivalent region 140 of the current block 120 referring to the part 180 that is outside the reference frame 150 is padded with pixel values of boundary pixels 190 of the reference frame 150. This conventional technique is known as a padding method.

When motion occurs in an outside region of a frame, compression efficiency of a block which refers to the outside of the frame by using the conventional simple padding method is decreased. In particular, compression efficiency of an active image sequence having panning, tilting, zooming in/out, fast camera motion, and fast object motion is greatly decreased.

The conventional padding method extends an outside region of a frame prior to performing a method of compensating for motion, and as such only limited information is used in the padding method. Thus, a region that is related to motion and is outside the frame is not accurately estimated.

SUMMARY OF THE INVENTION

The present invention provides a method and apparatus for accurately estimating and compensating for motion by using information of a region included in a neighboring block of a current block and a reference frame, when a reference block selected by a motion vector of the current block has a region that is outside the reference frame.

The present invention also provides a method and apparatus for estimating and compensating for motion, wherein the method and apparatus use correlation with a neighboring block and a reference frame, and can thereby greatly enhance compression efficiency of an active image sequence having panning, tilting, zooming in/out, fast camera motion, and fast object motion.

According to an aspect of the present invention, there is provided a method of estimating and compensating for motion in image decoding, the method including the operations of determining a reference block of a reference frame indicated by a motion vector of a current block of a current frame being decoded; and generating a spatiotemporal estimation block of the current block by using the current frame and the reference frame, when some pixels of the reference block are outside the reference frame.

When a block region in a same position as a region included in the reference frame is defined to be a first block region, wherein the block region is a part of the reference block, and a block region in a same position as a region excluded from the reference frame is defined to be a second block region, wherein the block region is a part of the reference block, the operation of generating the spatiotemporal estimation block may include the operations of determining the first block region of the reference block to be an estimation region of the first block region of the spatiotemporal estimation block; and generating an estimation region of the second block region of the spatiotemporal estimation block by using at least one of pixel values of neighboring blocks of the current block, and pixel values of an estimation region of the first block region.

When a block region in a same position as a region included in the reference frame is defined to be a first block region, wherein the block region is a part of the reference block, and a block region in a same position as a region excluded from the reference frame is defined to be a second block region, wherein the block region is a part of the reference block, the operation of generating the spatiotemporal estimation block may include the operations of determining pixels of the neighboring blocks of the current block and pixels surrounding the second block region to be a search pattern region, wherein the neighboring blocks are from among regions reconstructed prior to the current block, and the pixels surrounding the second block region are part of the first block region of the spatiotemporal estimation block, when the spatiotemporal estimation block is allocated to the current block; searching for an outside estimation region surrounded by a similar pattern region having a minimum difference compared with the search pattern region in the regions reconstructed prior to the current block; and determining the outside estimation region to be an estimation region of the second block region of the spatiotemporal estimation block.

The operation of searching for the outside estimation region may include the operation of searching for the similar pattern region having a same form as the search pattern region in the regions reconstructed prior to the current block, and having a minimum Sum of Absolute Differences (SAD) between pixel values of the search pattern region and pixel values of the similar pattern region.

The operation of determining the estimation region of the second block region of the spatiotemporal estimation block may include the operations of selecting at least one of a pixel line of the neighboring blocks of the current block and a pixel line surrounding the second block region, wherein the pixel line surrounding the second block region is a part of the first block region of the spatiotemporal estimation block, when the spatiotemporal estimation block is allocated to the current block; and determining pixels of the selected pixel line to be estimation pixels related to pixels of the second block region located either vertically or diagonally to the selected pixel line.

The operation of determining the estimation region of the second block region of the spatiotemporal estimation block may include the operation of determining an average value between pixel values of the neighboring blocks of the current block and pixel values surrounding the second block region to be an estimation pixel value of the second block region, wherein the pixel values surrounding the second block region are a part of the first block region of the spatiotemporal estimation block, when the spatiotemporal estimation block is allocated to the current block.

According to another aspect of the present invention, there is provided a method of estimating and compensating for motion in image encoding, the method including the operations of searching for a reference block having a minimum difference compared with a current block in a reference frame, calculating a motion vector, and thereby performing motion estimation; generating an estimation block for the current block by using the current frame and the reference frame, when some pixels of the reference block are outside the reference frame; and encoding an image by using the estimation block and the motion vector.

When a block region in a same position as a region included in the reference frame is defined to be a first block region, wherein the block region is a part of the reference block, and a block region in a same position as a region excluded from the reference frame is defined to be a second block region, wherein the block region is a part of the reference block, the operation of generating the estimation block may include the operations of determining the first block region of the reference block to be an estimation region of the first block region of the estimation block; and generating an estimation region of the second block region of the estimation block by using at least one of pixels of neighboring blocks of the current block and pixels of an estimation region of the first block region.

The operation of generating the estimation region of the second block region of the estimation block may include the operations of determining pixels of the neighboring blocks of the current block and pixels surrounding the second block region to be a search pattern region, wherein the neighboring blocks are from among regions reconstructed prior to the current block, and the pixels surrounding the second block region are of a part of the first block region of the estimation block, when the estimation block is allocated to the current block; searching for an outside estimation region surrounded by a similar pattern region having a minimum difference compared with the search pattern region in the regions reconstructed prior to the current block; and determining the outside estimation region to be an estimation region of the second block region of the estimation block.

The operation of searching for the outside estimation region may include the operation of searching for the similar pattern region having a same form as the search pattern region in the regions reconstructed prior to the current block, and having a minimum SAD between pixel values of the search pattern region and pixel values of the similar pattern region.

The operation of generating the estimation region of the second block region of the estimation block may include the operations of selecting at least one of a pixel line of the neighboring blocks of the current block and a pixel line surrounding the second block region, wherein the pixel line surrounding the second block region is a part of the first block region of the estimation block, when the estimation block is allocated to the current block; and determining pixels of the selected pixel line to be estimation pixels related to pixels of the second block region located either vertically or diagonally to the selected pixel line.

The operation of generating the estimation region of the second block region of the estimation block may include the operation of determining an average value between pixel values of the neighboring blocks of the current block and pixel values surrounding the second block region to be an estimation pixel value of the second block region, wherein the pixel values surrounding the second block region are a part of the first block region of the estimation block, when the estimation block is allocated to the current block.

According to another aspect of the present invention, there is provided a motion estimation and compensation apparatus in image decoding, the motion estimation and compensation apparatus including a reference block determining unit determining a reference block of a reference frame for a current block of a current frame being decoded; and a spatiotemporal estimation block generation unit generating a spatiotemporal estimation block of the current block by using the current frame and the reference frame, when some pixels of the reference block are outside the reference frame.

According to another aspect of the present invention, there is provided a motion estimation and compensation apparatus in image encoding, the motion estimation and compensation apparatus including a motion estimation performing unit searching for a reference block having a minimum difference compared with a current block in a reference frame, calculating a motion vector, and thereby performing motion estimation; an estimation block generation unit generating an estimation block for the current block by using the current frame and the reference frame, when some pixels of the reference block are outside the reference frame; and an encoding unit encoding an image by using the estimation block and the motion vector.

According to another aspect of the present invention, there is provided a computer readable recording medium having recorded thereon a program for executing the method of estimating and compensating for motion in image decoding.

According to another aspect of the present invention, there is provided a computer readable recording medium having recorded thereon a program for executing the method of estimating and compensating for motion in image encoding.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method and apparatus for estimating and compensating for motion in image decoding, and a method and apparatus for encoding an image, according to exemplary embodiments of the present invention will now be described more fully with reference to the accompanying drawings, in which exemplary embodiments of the invention are shown.

Figure 1:
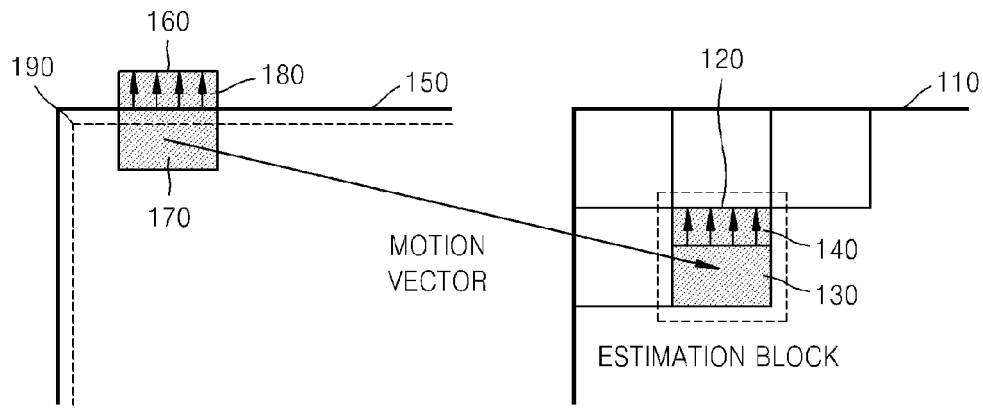
FIG. 1 is a diagram of a conventional method of estimating and compensating for motion when a reference block is outside a reference frame.
Figure 2:
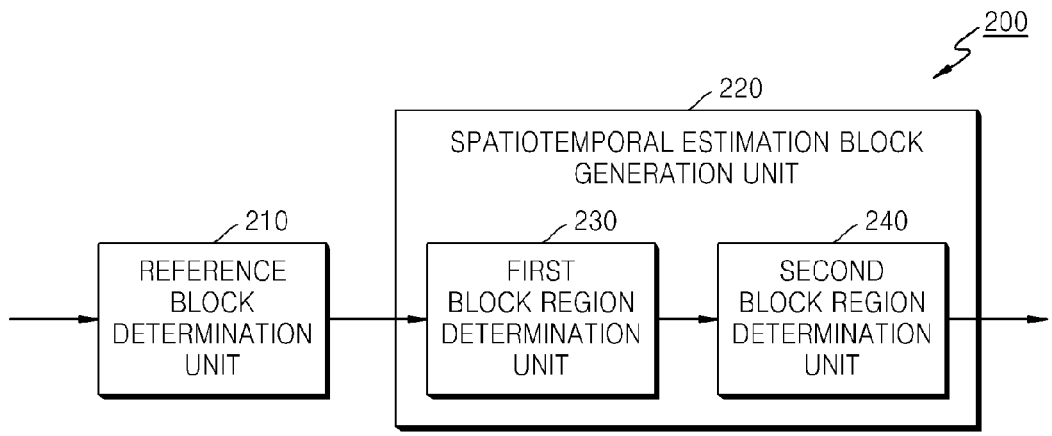
FIG. 2 is a block diagram illustrating a motion estimation and compensation apparatus for image decoding according to an exemplary embodiment of the present invention.

FIG. 2 is a block diagram illustrating a motion estimation and compensation apparatus 200 for image decoding according to an embodiment of the present invention.

The motion estimation and compensation apparatus 200 for image decoding according to the current embodiment of the present invention includes a reference block determination unit 210, and a spatiotemporal estimation block generation unit 220. The spatiotemporal estimation block generation unit 220 includes a first block region determination unit 230, and a second block region determination unit 240.

The reference block determination unit 210 determines a reference block of a reference frame for a current block of a current frame being decoded.

When some pixels of the reference block are outside the reference frame, the spatiotemporal estimation block generation unit 220 generates a spatiotemporal estimation block of the current block by using the current frame and the reference frame.

For convenience of description, it is assumed that a block region in the same position as a region included in the reference frame is defined to be a first block region, wherein the block region is a part of the reference block, and a block region in the same position as a region excluded from the reference frame is defined to be a second block region, wherein the block region is a part of the reference block.

The first block region determination unit 230 determines the first block region of the reference block to be an estimation region of a first block region of the spatiotemporal estimation block.

The second block region determination unit 240 generates an estimation region of a second block region of the spatiotemporal estimation block by using at least one of pixel values of neighboring blocks of the current block and pixel values of the estimation region of the first block region.

Embodiments related to the second block region determination unit 240 will be described later in detail with reference to FIGS. 4 through 6C.

An aspect of the present invention determines blocks estimated by the reference block, and in particular, the spatiotemporal estimation blocks generated by the spatiotemporal estimation block generation unit 220 when the reference block is outside the reference frame, to be a current block, and as such an image is reconstructed during image decoding.

Figure 3:
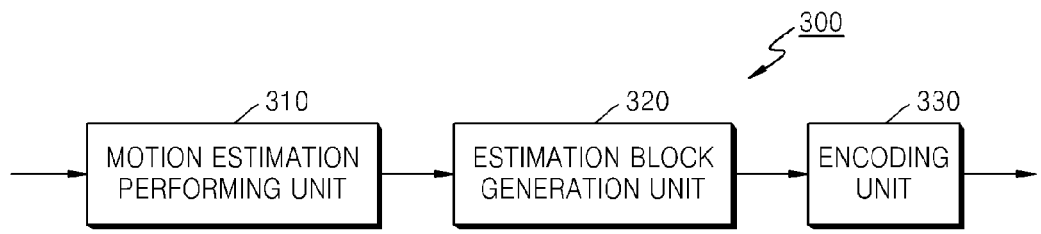
FIG. 3 is a block diagram illustrating a motion estimation and compensation apparatus for image encoding according to another exemplary embodiment of the present invention.

FIG. 3 is a block diagram illustrating a motion estimation and compensation apparatus 300 for image encoding according to another embodiment of the present invention.

The motion estimation and compensation apparatus 300 for image encoding according to the current embodiment of the present invention includes a motion estimation performing unit 310, an estimation block generation unit 320, and an encoding unit 330.

The motion estimation performing unit 310 searches for a reference block in a reference frame, wherein the reference block has a minimum difference compared with a current block, calculates a motion vector, and thereby performs motion estimation.

The motion estimation performing unit 310 may determine a block to be the reference block, wherein the block has a minimum Sum of Absolute Differences (SAD) between each pixel value of a block in the reference frame and each pixel value of the current block. The motion vector may indicate a positional distance between the current block and the reference block.

When some pixels of the reference block are outside the reference frame, the estimation block generation unit 320 generates an estimation block for the current block by using the current frame and the reference frame.

An embodiment for the estimation block generation unit 320 is not illustrated. However, similar to the motion estimation and compensation apparatus 200 for image decoding, the estimation block generation unit 320 includes a first block region determination unit and a second block region determination unit which are respectively for a first block region and a second block region of the estimation block. The first and second block region determination units of the estimation block generation unit 320 respectively have the same operating principle as the first and second block region determination units of the spatiotemporal estimation block generation unit 220. Thus, the operating principle of the first and second block region determination units of the estimation block generation unit 320 will be described later with reference to FIGS. 4 through 6C.

The encoding unit 330 encodes an image by using the estimation block and the motion vector.

The encoding unit 330 may determine the estimation block to be the current block, and encode the image by using a difference value between the current block and the reference block.

Figure 4:
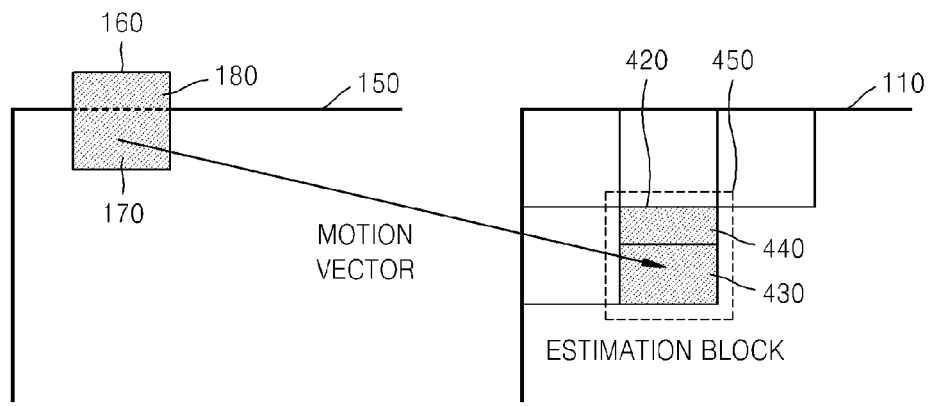
FIG. 4 is a diagram illustrating a method of generating an estimation block when a reference block is outside a reference frame, according to an exemplary embodiment of the present invention.

FIG. 4 is a diagram illustrating a method of generating an estimation block when a reference block is outside a reference frame, according to an embodiment of the present invention.

Referring to FIG. 4, a method of operating the spatiotemporal estimation block generation unit 220 of the motion estimation and compensation apparatus 200 for image decoding, and the estimation block generation unit 320 of the motion estimation and compensation apparatus 300 for image encoding will now be described in detail. In particular, a method of operating the first and second block region determination units of the spatiotemporal estimation block generation unit 220 and the estimation block generation unit 320 will now be described in detail.

A frame 110, a frame 150, and a block 160 respectively indicate a current frame, a reference frame, and a reference block.

A region 170 of the reference block 160 indicates a region included in the reference frame 150. A region 180 of the reference block 160 indicates a region excluded from the reference frame 150.

A block 420 indicates a spatiotemporal estimation block. Since the spatiotemporal estimation block generated by the present invention is determined to be a current block, the block 420 eventually becomes a current block 120.

A region 430 indicates a first block region of the spatiotemporal estimation block 420.

A region 440 indicates a second block region of the spatiotemporal estimation block 420.

A region 450 indicates pixels surrounding the current block 120, wherein the pixels are from among neighboring blocks of the current block 120.

When the reference block 160 related to the current block 120 is inside the reference frame 150, an estimation block related to the current block 120 can be determined by a motion estimation/compensation method that is well-known to one of ordinary skill in the art. Hereinafter, a case in which the reference block 160 is outside the reference frame 150 will now be described in detail.

As described above, it is assumed that a block region in the same position as the region 170 included in the reference frame 150 is defined to be a first block region, wherein the block region is a part of the reference block 160, and a block region in the same position as the region 180 excluded from the reference frame 150 is defined to be a second block region, wherein the block region is a part of the reference block 160. Thus, the region 430 and the region 440 respectively become the first block region and the second block region, which are of the spatiotemporal estimation block 420 that is to be inserted into the current block 120.

The first block region determination unit 230 may determine the first block region 170 of the reference block 160 to be an estimation region of the first block region 430 of the spatiotemporal estimation block 420.

The second block region determination unit 240 may generate an estimation region of the second block region 440 of the spatiotemporal estimation block 420 by using at least one of pixel values of neighboring blocks of the current block 120, and pixel values of the estimation region of the first block region 430 of the spatiotemporal estimation block 420.

The second block region determination unit 240 may use a method of using a search pattern including the pixels 450, and a method of using values of some of the pixels 450 without a change, wherein the pixels 450 surrounding the current block 120 are from among pixels of the neighboring blocks and first block region 430, so as to use the neighboring blocks of the current block 120 and the estimation region of the first block region 430 of the spatiotemporal estimation block 420. The method of using the search pattern will be described later with reference to FIG. 5, and the method of using the pixels 450 will be described later with reference to FIGS. 6A through 6C.

The first and second block region determination units of the estimation block generation unit 320 for image encoding respectively have the same operating principle as the first and second block region determination units 230 and 240 of the spatiotemporal estimation block generation unit 220 for image decoding.

Figure 5:
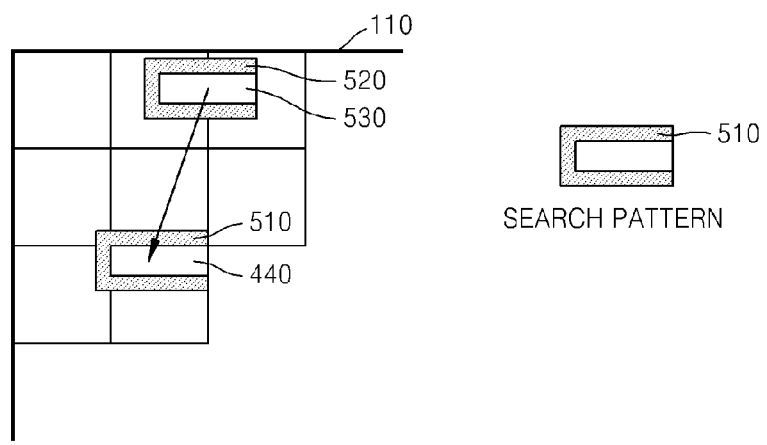
FIG. 5 is a diagram illustrating an example of a type of a search pattern for estimating a region that is outside a reference frame.

FIG. 5 is a diagram illustrating an example of a type of a search pattern for estimating a region that is outside a reference frame.

A method of operating an example of the second block region determination unit 240 of the spatiotemporal estimation block generation unit 220 for image decoding, and an example of the second block region determination unit of the estimation block generation unit 320 for image encoding will now be described in detail with reference to FIG. 5.

A region 510 indicates a search pattern region for determining the second block region 440.

A region 520 indicates a similar pattern region searched for by the search pattern region 510.

A region 530 indicates an outside estimation region.

The second block region determination unit 240 may determine pixels of the neighboring blocks of the current block 120 and pixels surrounding the second block region 440 to be the search pattern region 510, wherein the neighboring blocks are from among regions reconstructed prior to the current block 120, and the pixels surrounding the second block region 440 are part of the first block region 430 of the spatiotemporal estimation block (estimation block) 420.

Also, the second block region determination unit 240 may search for the similar pattern region 520 having a minimum difference compared with the search pattern region 510 in the regions reconstructed prior to the current block 120. The similar pattern region 520 has the same form as the search pattern region 510, and a region having a minimum SAD (that is the sum of the absolute values of the difference between pixel values of the search pattern region 510 and pixel values of the similar pattern region 520) in the regions reconstructed prior to the current block 120 is determined to be the similar pattern region 520.

The outside estimation region 530 corresponds to a region surrounded by the similar pattern region 520 determined by the search pattern region 510. The second block region determination unit 240 determines the outside estimation region 530 to be an estimation region of the second block region 440, and thereby completes the spatiotemporal estimation block (estimation block) 420.

Figure 6A:
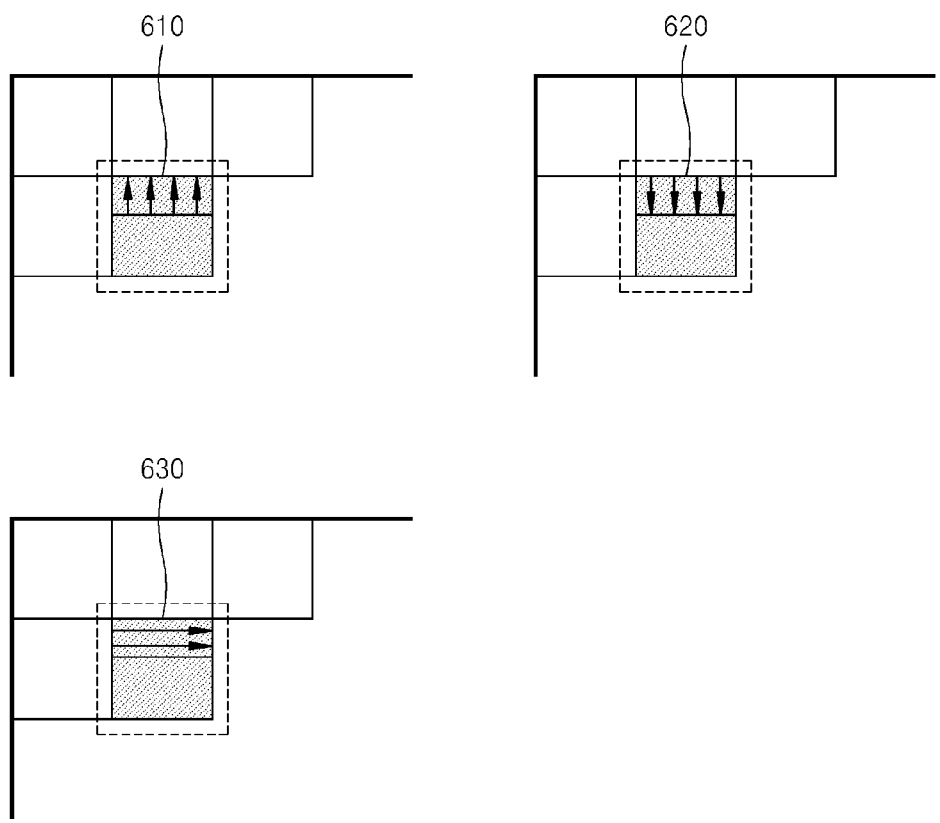
FIG. 6A provides diagrams illustrating one of various methods of estimating a region that is outside a reference frame.
Figure 6B:
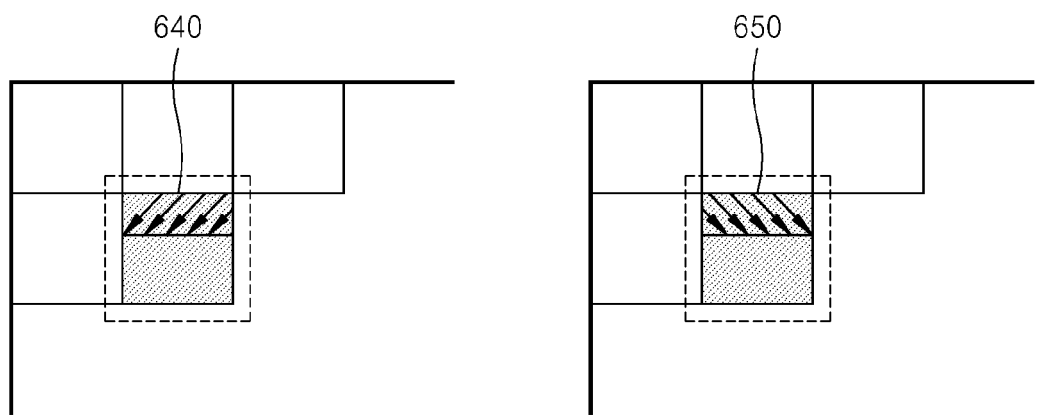
FIG. 6B provides diagrams illustrating another method from among various methods of estimating a region that is outside a reference frame.
Figure 6C:
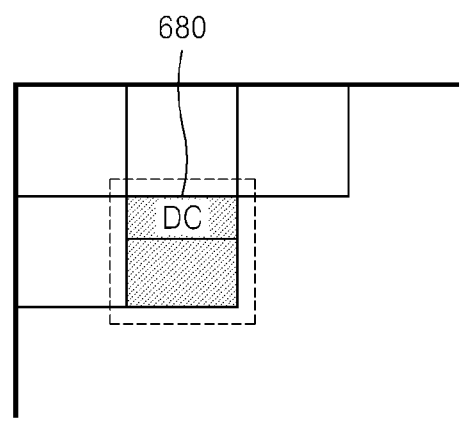
FIG. 6C provides a diagram illustrating another method from among various methods of estimating a region that is outside a reference frame.

FIGS. 6A through 6C are diagrams illustrating various methods of estimating a region that is outside a reference frame, according to another embodiment of the present invention.

A method of operating an example for the second block region determination unit 240 of the spatiotemporal estimation block generation unit 220 for image decoding, and an example of the second block region determination unit of the estimation block generation unit 320 for image encoding will now be described in detail with reference to FIGS. 6A through 6C. In particular, the method is related to a method of determining the second block region 440 by using the aforementioned pixels 450.

FIG. 6A provides diagrams illustrating one of the various methods of estimating the region that is outside the reference frame.

A block 610 indicates the spatiotemporal estimation block (estimation block) 420 in which each pixel value of the first block region 430 is inserted vertically to a boundary line and to each pixel of the second block region 440.

A block 620 indicates the spatiotemporal estimation block (estimation block) 420 in which each pixel value of a previously reconstructed neighboring block is inserted vertically to a boundary line and to each pixel of the second block region 440.

A block 630 indicates the spatiotemporal estimation block (estimation block) 420 in which each pixel value of the previously reconstructed neighboring block is inserted horizontally to a boundary line and to each pixel of the second block region 440.

The pixel values of the previously reconstructed neighboring block that is the nearest block to the second block region 440 of the current block 120 are inserted vertically and horizontally to the boundary line and to each pixel of the second block region 440 from the boundary lines between the current block 120 and the previously reconstructed neighboring block, such that the estimation blocks 620 and 630 are generated.

The pixel values of the first block region 430 that is the nearest block region to the second block region 440 are inserted vertically to each pixel of the second block region 440 from the boundary line between the first block region 430 and the second block region 440, and such that the estimation block 610 is generated.

FIG. 6B provides diagrams illustrating another method from among the various methods of estimating the region that is outside the reference frame.

A block 640 indicates the spatiotemporal estimation block (estimation block) 420 in which the pixel values of the previously reconstructed neighboring block are inserted diagonally left to each pixel of the second block region 440.

A block 650 indicates the spatiotemporal estimation block (estimation block) 420 in which the pixel values of the previously reconstructed neighboring block are inserted diagonally right to each pixel of the second block region 440.

A block 660 indicates the spatiotemporal estimation block (estimation block) 420 in which each pixel value of the first block region 430 is inserted diagonally right to each pixel of the second block region 440.

A block 670 indicates the spatiotemporal estimation block (estimation block) 420 in which each pixel value of the first block region 430 is inserted diagonally left to each pixel of the second block region 440.

The pixel values of the previously reconstructed neighboring block that is the nearest block to the second block region 440 of the current block 120 are inserted diagonally to the boundary line and to each pixel of the second block region 440 from the boundary line between the current block 120 and the previously reconstructed neighboring block, such that the estimation blocks 640 and 650 are generated.

The pixel values of the first block region 430 that is the nearest block region to the second block region 440 are inserted diagonally to each pixel of the second block region 440 from the boundary line between the first block region 430 and the second block region 440, such that the estimation blocks 660 and 670 are generated.

FIG. 6C provides a diagram illustrating another method from among the various methods of estimating the region that is outside the reference frame.

A block 680 indicates the spatiotemporal estimation block (estimation block) 420 in which an average value of pixel values included in the region 510 is determined by estimation pixel values of the second block region 440.

The estimation block 680 determines an average value of pixel values of the previously reconstructed neighboring blocks from among neighboring blocks of the current block 120, and a region that is the same as the search pattern region 510 that comprises pixels of the first block region 430, wherein the pixels are the nearest pixels to the second block region 440, to be an estimation region.

Figure 7:
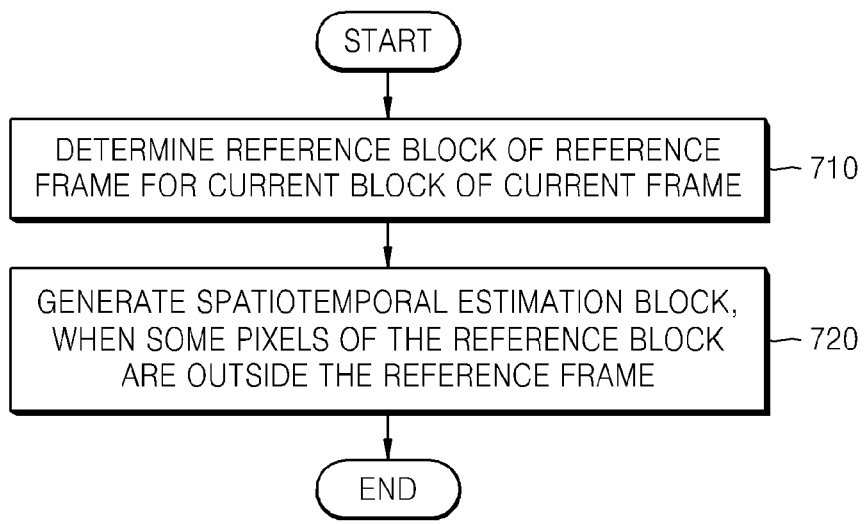
FIG. 7 is a flowchart of a method of estimating and compensating for motion in image decoding, according to another exemplary embodiment of the present invention.

FIG. 7 is a flowchart of a method of estimating and compensating for motion in image decoding, according to another embodiment of the present invention.

In operation 710, a reference block of a reference frame for a current block of a current frame is determined by using a received frame and a motion vector.

In operation 720, when some pixels of the reference block are outside the reference frame, a spatiotemporal estimation block for the current block is generated by using the current frame and the reference frame.

In the current embodiment, the spatiotemporal estimation block is divided into a first block region corresponding to a region included in the reference frame, wherein the region is a part of the reference block, and a second block region corresponding to a region excluded from the reference frame, wherein the region is a part of the reference block, and as such the spatiotemporal estimation block corresponding to the respective regions is generated. That is, temporal estimation using pixel values of the reference block is performed on the first block region of the spatiotemporal estimation block, and spatial estimation using pixel values of a neighboring block of the current block is performed on the second block region of the spatiotemporal estimation block.

Figure 8:
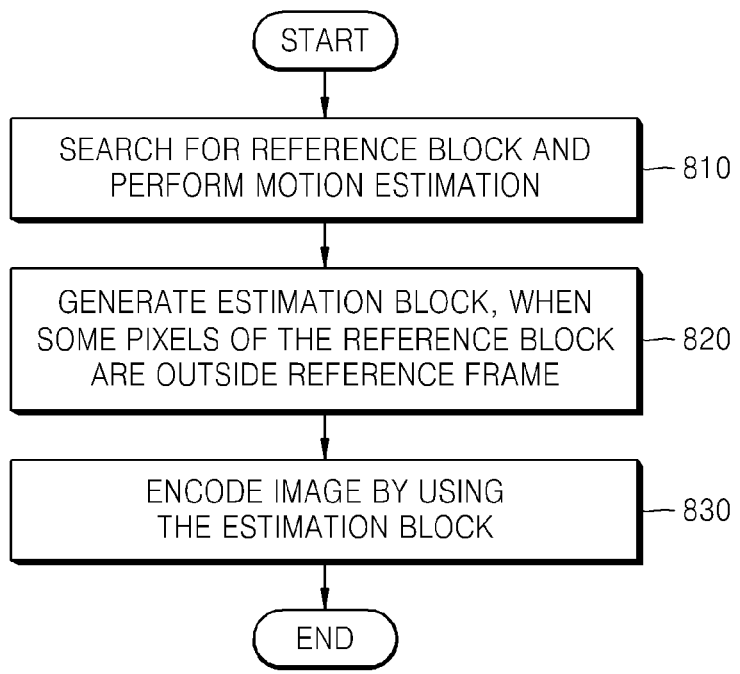
FIG. 8 is a flowchart of a method of estimating and compensating for motion in image encoding, according to another exemplary embodiment of the present invention.

FIG. 8 is a flowchart of a method of estimating and compensating for motion in image encoding, according to another embodiment of the present invention.

In operation 810, a reference block having a minimum difference compared with a current block is searched for in a reference frame, a motion vector is calculated, and thereby motion estimation is performed.

In operation 820, when some pixels of the reference block are outside the reference frame, an estimation block for the current block is generated by using a current frame and the reference frame.

In the current embodiment, the spatiotemporal estimation block is divided into a first block region corresponding to a region included in the reference frame, wherein the region is a part of the reference block, and a second block region corresponding to a region excluded from the reference frame, wherein the region is a part of the reference block, and as such the spatiotemporal estimation block corresponding to the respective regions is generated. That is, temporal estimation using pixel values of the reference block is performed on the first block region of the spatiotemporal estimation block, and spatial estimation using pixel values of a neighboring block of the current block is performed on the second block region of the spatiotemporal estimation block.

In operation 830, an image is encoded by using the estimation block and the motion vector. In this manner, motion compensation is performed during image encoding and then the image to be encoded is reconstructed. Thus, it is possible to use the image in which information regarding motion is more accurately reflected.

When the reference block, which is selected by the motion vector, for the current block has the region that is outside the reference frame, the method and apparatus for estimating and compensating for the motion in image decoding according to the present invention use information of the region included in the neighboring block of the current block and the reference frame. Accordingly, the method and apparatus can accurately estimate and compensate for the motion in comparison with the conventional technology.

While the conventional technology uses a padding method which depends on limited information corresponding to boundary pixels of a reference frame, the method and apparatus for estimating and compensating for motion in image decoding according to the present invention use the information of the region included in the neighboring block and the reference frame. By doing so, the method and apparatus has reflected therein correlation with the reference frame, thereby has high compression efficiency. In particular, the compression efficiency of an active image sequence having panning, tilting, zooming in/out, fast camera motion, and fast object motion is greatly increased.

Among exemplary embodiments of the present invention, an effect of the method of estimating and compensating for motion in image decoding is higher than an effect of the method of estimating and compensating for motion in image encoding, in terms of calculation time.

The present invention can be applied to video codecs based on temporal motion estimation, or to all methods and apparatuses such as mobile phones, camcorders, digital cameras, Portable Multimedia Players (PMPs), next-generation Digital Video Discs (DVDs), software video codes, and the like which are capable of using the video codecs.

Exemplary embodiments of the present invention can be written as computer programs and can be implemented in general-use digital computers that execute the programs using a computer readable recording medium and other media. In addition, a data structure used in the embodiments of the present invention can be written in a computer readable recording medium through various means. Examples of the computer readable recording medium include magnetic storage media (e.g., ROM, floppy disks, hard disks, etc.) and optical recording media (e.g., CD-ROMs, or DVDs) An example of other media is carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of estimating and compensating for motion in image decoding, the method comprising:
   determining a reference block of a reference frame indicated by a motion vector of a current block of a current frame being decoded; and
   generating a spatiotemporal estimation block of the current block by using at least one of the current frame and the reference frame,
   wherein, when some pixels of the reference block are outside the reference frame, a first block region of the reference block is in the reference frame, and a second block region of the reference block is outside the reference frame,
   and wherein the generating of the spatiotemporal estimation block comprises:
   determining the first block region of the reference block to be an estimation region of the first block region of the spatiotemporal block; and
   generating an estimation region of the second block region of the spatiotemporal estimation block by using at least one of pixel values of neighboring blocks of the current block, and pixel values of an estimation region of the first block region.

2. The method of claim 1, wherein the first block region of the spatiotemporal estimation block is a region in a same position as a region which is a part of the reference block included in the reference frame, and the second block region of the spatiotemporal estimation block is a region in a same position as a region which is a part of the reference block excluded from the reference frame.

3. The method of claim 1, wherein the generating of the spatiotemporal estimation block comprises:
   determining pixels of the neighboring blocks of the current block and pixels surrounding the second block region to be a search pattern region, wherein the neighboring blocks are from among regions reconstructed prior to the current block, and the pixels surrounding the second block region are part of the first block region of the spatiotemporal estimation block;
   searching for an outside estimation region surrounded by a similar pattern region having a minimum difference compared with the search pattern region in the regions reconstructed prior to the current block; and
   determining the outside estimation region to be an estimation region of the second block region of the spatiotemporal estimation block.

4. The method of claim 3, wherein the searching for the outside estimation region comprises searching for the similar pattern region having a same form as the search pattern region in the regions reconstructed prior to the current block, and having a minimum SAD (Sum of Absolute Differences) between pixel values of the search pattern region and pixel values of the similar pattern region.

5. The method of claim 1, wherein the determining of the estimation region of the second block region of the spatiotemporal estimation block comprises:
   selecting at least one of a pixel line of the neighboring blocks of the current block and a pixel line surrounding the second block region, wherein the pixel line surrounding the second block region is a part of the first block region of the spatiotemporal estimation block; and
   determining pixels of the selected pixel line to be estimation pixels related to pixels of the second block region located either vertically or diagonally to the selected pixel line.

6. The method of claim 1, wherein the determining of the estimation region of the second block region of the spatiotemporal estimation block comprises determining an average value between pixel values of the neighboring blocks of the current block and pixel values surrounding the second block region to be an estimation pixel value of the second block region, wherein the pixel values surrounding the second block region are a part of the first block region of the spatiotemporal estimation block, when the spatiotemporal estimation block is allocated to the current block.

7. A motion estimation and compensation apparatus in image decoding, the motion estimation and compensation apparatus comprising:
   a reference block determining unit which determines a reference block of a reference frame for a current block of a current frame being decoded; and
   a spatiotemporal estimation block generation unit which generates a spatiotemporal estimation block of the current block by using at least one of the current frame and the reference frame, when some pixels of the reference block are outside the reference frame,
   wherein, when a first block region of the reference block is in the reference frame, and a second block region of the reference block is outside the reference frame, the spatiotemporal estimation block generation unit comprises:
   a first block region determination unit which determines the first block region of the reference block to be an estimation region of the first block region of the spatiotemporal estimation block; and
   a second block region determination unit which determines an estimation region of the second block region of the estimation block by using at least one of pixels of neighboring blocks of the current block and pixels of an estimation region of the first block region.

8. The motion estimation and compensation apparatus of claim 7, wherein the first block region of the spatiotemporal estimation block is a region in a same position as a region which is a part of the reference block included in the reference frame, and the second block region of the spatiotemporal estimation block is a region in a same position as a region which is a part of the reference block excluded from the reference frame, and the second block region determination unit determines pixels of neighboring blocks of the current block and pixels surrounding the second block region to be a search pattern region, wherein the pixels surrounding the second block region are part of the first block region of the spatiotemporal estimation block, and determines a region corresponding to the second block region of the spatiotemporal estimation block in the current frame by using the determined search pattern region.

9. The motion estimation and compensation apparatus of claim 7, wherein the first block region of the spatiotemporal estimation block is a region in a same position as a region which is a part of the reference block included in the reference frame, and the second block region of the spatiotemporal estimation block is a region in a same position as a region which is a part of the reference block excluded from the reference frame, and the second block region determination unit selects at least one of a pixel line of the neighboring blocks of the current block and a pixel line surrounding the second block region, wherein the pixel line surrounding the second block region is a part of the first block region of the spatiotemporal estimation block, and determines an estimation region of the second block region of the spatiotemporal estimation block in the current frame by using the selected pixel line.

10. A non-transitory computer readable recording medium having recorded thereon a program for executing the method of claim 1.

11. A method of estimating and compensating for motion in image encoding, the method comprising:

searching for a reference block having a minimum difference compared with a current block in a reference frame, calculating a motion vector, and thereby performing motion estimation;

generating an estimation block for the current block by using at least one of the current frame and the reference frame, when some pixels of the reference block are outside the reference frame; and encoding an image by using the estimation block and the motion vector, wherein, when a first block region of the reference block is in the reference frame, and a second block region of the reference block is outside the reference frame, the generating of the estimation block comprises:

determining the first block region of the reference block to be an estimation region of the first block region of the estimation block; and generating an estimation region of the second block region of the estimation block by using at least one of pixels of neighboring blocks of the current block and pixels of an estimation region of the first block region.

12. The method of claim 11, wherein the first block region of the estimation block is a block region in a same position as a region which is a part of the reference block included in the reference frame, and the second block region of the estimation block is a block region in a same position as a region which is a part of the reference block excluded from the reference frame.

13. The method of claim 11, wherein the generating of the estimation region of the second block region of the estimation block comprises:

determining pixels of the neighboring blocks of the current block and pixels surrounding the second block region to be a search pattern region, wherein the neighboring blocks are from among regions reconstructed prior to the current block, and the pixels surrounding the second block region are part of the first block region of the estimation block;

searching for an outside estimation region surrounded by a similar pattern region having a minimum difference compared with the search pattern region in the regions reconstructed prior to the current block; and determining the outside estimation region to be an estimation region of the second block region of the estimation block.

14. The method of claim 13, wherein the searching for the outside estimation region comprises searching for the similar pattern region having a same form as the search pattern region in the regions reconstructed prior to the current block, and having a minimum SAD between pixel values of the search pattern region and pixel values of the similar pattern region.

15. The method of claim 11, wherein the generating of the estimation region of the second block region of the estimation block comprises:

selecting at least one of a pixel line of the neighboring blocks of the current block and a pixel line surrounding the second block region, wherein the pixel line surrounding the second block region is a part of the first block region of the estimation block; and determining pixels of the selected pixel line to be estimation pixels related to pixels of the second block region located either vertically or diagonally to the selected pixel line.

16. The method of claim 11, wherein the generating of the estimation region of the second block region of the estimation block comprises determining an average value between pixel values of the neighboring blocks of the current block and pixel values surrounding the second block region to be an estimation pixel value of the second block region, wherein the pixel values surrounding the second block region are a part of the first block region of the estimation block.

17. A motion estimation and compensation apparatus in image encoding, the motion estimation and compensation apparatus comprising:

a motion estimation performing unit which searches for a reference block having a minimum difference compared with a current block in a reference frame, calculating a motion vector, and thereby performs motion estimation;

an estimation block generation unit which generates an estimation block for the current block by using at least one of the current frame and the reference frame, when some pixels of the reference block are outside the reference frame; and an encoding unit which encodes an image by using the estimation block and the motion vector, wherein, when a first block region of the reference block is in the reference frame, and a second block region of the reference block is outside the reference frame, the estimation block generation unit comprises:

a first block region determination unit which determines the first block region of the reference block to be an estimation region of the first block region of the estimation block; and a second block region determination unit which determines an estimation region of the second block region of the estimation block by using at least one of pixel values of neighboring blocks of the current block and pixel values of an estimation region of the first block region.

18. The motion estimation and compensation apparatus of claim 17, wherein the first block region of the estimation block is a region in a same position as a region which is a part of the reference block included in the reference frame, and the second block region of the estimation block is a region in a same position as a region which is a part of the reference block excluded from the reference frame, and the second block region determination unit determines pixels of neighboring blocks of the current block and pixels surrounding the second block region to be a search pattern region, wherein the pixels surrounding the second block region are part of the first block region of the estimation block, and determines a region corresponding to the second block region of the estimation block in the current frame by using the determined search pattern region.

19. The motion estimation and compensation apparatus of claim 17, wherein the first block region of the estimation block is a region in a same position as a region which is a part of the reference block included in the reference frame, and the second block region of the estimation block is a region in a same position as a region which is a part of the reference block excluded from the reference frame, and the second block region determination unit selects at least one of a pixel line of the neighboring blocks of the current block and a pixel line surrounding the second block region, wherein the pixel line surrounding the second block region is a part of the first block region of the estimation block, and determines an estimation region of the second block region of the estimation block in the current frame by using the selected pixel line.

20. A non-transitory computer readable recording medium having recorded thereon a program for executing the method of claim 11.

* * * * *